United States Patent
Siracusano, Jr.

(10) Patent No.: US 9,462,017 B1
(45) Date of Patent: Oct. 4, 2016

(54) MEETING COLLABORATION SYSTEMS, DEVICES, AND METHODS

(71) Applicant: Louis Siracusano, Jr., Northvale, NJ (US)

(72) Inventor: Louis Siracusano, Jr., Northvale, NJ (US)

(73) Assignee: LHS PRODUCTIONS, INC., Northvale, NJ (US)

( * ) Notice: Subject to any disclaimer, the term of this patent is extended or adjusted under 35 U.S.C. 154(b) by 0 days.

(21) Appl. No.: 14/740,638

(22) Filed: Jun. 16, 2015

Related U.S. Application Data

(60) Provisional application No. 61/998,039, filed on Jun. 16, 2014.

(51) Int. Cl.
  *G06F 3/048* (2013.01)
  *H04L 29/06* (2006.01)
  *G06F 3/0484* (2013.01)
  *G06F 3/0486* (2013.01)

(52) U.S. Cl.
  CPC .......... *H04L 65/403* (2013.01); *G06F 3/0486* (2013.01); *G06F 3/04842* (2013.01); *G06F 3/04847* (2013.01); *H04L 65/1089* (2013.01); *H04L 65/601* (2013.01)

(58) Field of Classification Search
  CPC ............ G06F 3/017; G06F 3/1454; G06F 17/30017; G06F 17/3087; G06F 3/0481–3/04883; H04L 12/1822; H04L 12/1827; H04L 29/06; H04L 29/06027; H04L 65/403; H04N 7/142; H04N 7/147; H04N 7/15; H04N 21/4788
  See application file for complete search history.

(56) References Cited

U.S. PATENT DOCUMENTS

| | | | |
|---|---|---|---|
| 2004/0174392 A1* | 9/2004 | Bjoernsen | G06Q 10/10 715/751 |
| 2007/0143103 A1* | 6/2007 | Asthana | H04M 3/567 704/200 |
| 2011/0119588 A1* | 5/2011 | Siracusano, Jr. | G06F 3/0481 715/723 |
| 2012/0284641 A1* | 11/2012 | Sitrick | G06F 17/2288 715/753 |
| 2013/0028400 A1* | 1/2013 | Fix | G09B 5/12 379/88.13 |
| 2015/0358584 A1* | 12/2015 | Mattson | H04N 7/15 348/14.08 |

* cited by examiner

*Primary Examiner* — Claudia Dragoescu
(74) *Attorney, Agent, or Firm* — Ira Stickler, Esq.

(57) ABSTRACT

A method for conducting a communications session (e.g., a teleconference) may include: displaying, by a client device, a communications interface that may include a first canvas, a second canvas, and a content browser. The first canvas may be arranged to display a media stream. The second canvas may be arranged to display a sequence of content items that may be provided by a communications system (e.g., a teleconferencing system). The content browser may be arranged to display identifiers for one or more files that are associated with the teleconference. The method may further include detecting a first input that moves a file from the content browser onto the second canvas, and in response to the first input, transmitting from the client device to the communications system, an instruction to generate a new sequence of content items based on at least a portion of the file.

23 Claims, 6 Drawing Sheets

MEETING COLLABORATION SYSTEMS, DEVICES, AND METHODS

CROSS-REFERENCE TO RELATED APPLICATIONS

This application claims priority to and the benefit of U.S. Provisional Patent Application Ser. No. 61/998,039, filed on Jun. 16, 2014, the entire contents of which are hereby incorporated by reference herein.

BACKGROUND

1. Technical Field

The present disclosure generally relates to browser-based software solutions, and more particularly to an online/virtual content collaboration system.

2. Background of Related Art

Many conferences, meetings and training programs in corporate and educational environments require that presenters and attendees actively participate, share, and collaborate on and with a variety of different content types (e.g., images, documents, videos). Increasingly, such conferences and meetings are taking place over the Internet as opposed to in actual face-to-face meetings such that participants may be located in geographically distant locations. However, to date when participants have used "collaboration" technology as an alternative to meeting face-to-face, the level of interaction between participants has typically been hampered by tools that are insufficient to facilitate collaborative efforts to review, discuss, manipulate, and share information in real-time. This has become an enormous challenge in corporate and education environments, where lectured learning sessions, as well as virtual business meetings (where complex information is shared) are being attempted in business centers, conference rooms, classrooms, company boardrooms, and the like across the globe.

SUMMARY

According to aspects of the disclosure, a method is provided for conducting a communications session comprising: displaying, by a client device, a communications interface including a first canvas, a second canvas, and a content browser, wherein: the first canvas is arranged to display a media stream; the second canvas is arranged to display a sequence of content items provided by a communications system; and the content browser is arranged to display identifiers for one or more files that are associated with the communications session detecting a first input that moves a file from the content browser onto the second canvas; and in response to the first input, transmitting, from the client device to the communications system, an instruction to add at least a portion of the file to the sequence of content items from the client device to the communications system.

The media stream may have a frame rate that is selectable based on bandwidth. The media stream may be a first video, and the frames of the first video may be selectable to create a new video including the selected frames. The creating of the new video may include selecting a range of times including a start time and an end time, the new video including all frames within the range of times. The communications interface may further comprise a participant work area accessible to a first participant, the participant work area including a content portion and a communications portion, wherein the communications portion permits communication between the first participant and a second participant. The method may further include detecting a second input for selecting one of the content items in the second canvas and transferring the one of the content items to the participant work area, and detecting a third input selecting a content item in the participant work area and displaying the content item in the second canvas.

The content of the media stream may be transmitted to session participants asynchronously. The media stream may be transmitted to session participants in a plurality of languages. Geospatial and temporal data may be associated with the content items.

The method may also include displaying a timeline, the timeline including a plurality of indications of different states of at least one of the first and second canvases at different times of the session. The method also include recording a state of the participant work area at different times of the session such that participant activities during the session may be recorded, thereby providing analytics that can be analyzed.

According to aspects of the disclosure, a method is provided for conducting a communications session comprising: displaying, by a client device, a communications interface including a first canvas, a second canvas, and a content browser, wherein: the first canvas is arranged to display a media stream; the second canvas is arranged to display a sequence of content items provided by a communications system; and the content browser is arranged to display identifiers for one or more files that are associated with the communications session; detecting, by the client device, a first input to the second; and modifying, in response to the first input, a content item displayed in the second canvas and transmitting an instruction to disseminate the modification among one or more other client devices that participate in the communications session.

According to aspects of the disclosure, an electronic device is provided for conducting a communications session, comprising a display and processor, wherein the processor is configured to: present, on the display, a communications interface including a first canvas, a second canvas, and a content browser, wherein: the first canvas is arranged to display a media stream; the second canvas is arranged to display a sequence of content items provided by a communications system; and the content browser is arranged to display identifiers for one or more files that are associated with the communications session; detect a first input that moves a file from the content browser onto the second canvas; and transmit, in response to the first input, to the communications system an instruction to add at least a portion of the file to the sequence of content items.

According to aspects of the disclosure, an electronic device is provided for conducting a communications session, comprising a display and processor, wherein the processor is configured to: present, on the display, a communications interface including a first canvas, a second canvas, and a content browser, wherein: the first canvas is arranged to display a media stream; the second canvas is arranged to display a sequence of content items provided by a communications system; and the content browser is arranged to display identifiers for one or more files that are associated with the communications session; detect, by the client device, a first input to the second canvas; and modify, in response to the first input, a content item displayed in the second canvas and transmitting an instruction to disseminate the modification among one or more other client devices that participate in the communications session.

These and other aspects of the present disclosure are described herein below with reference to the accompanying drawings.

BRIEF DESCRIPTION OF THE DRAWINGS

By way of description only, embodiments of the disclosure will be described with reference to the accompanying drawings, in which.

DETAILED DESCRIPTION

Figure 1:
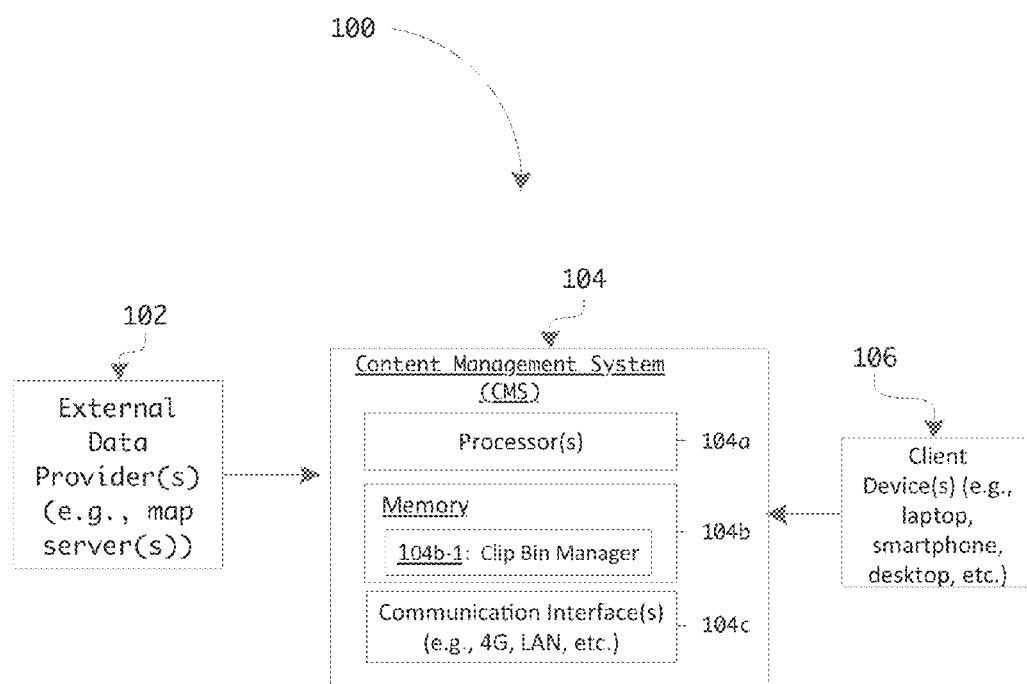
FIG. 1 depicts a schematic diagram of a system.

Embodiments of the presently disclosed virtual collaboration system, devices, and methods will now be described in detail with reference to the appended figures, in which like reference numerals designate identical, corresponding, or like elements in each of the several views. In the following description, well-known functions or constructions are not described in detail to avoid obscuring the present disclosure in unnecessary detail. The term "or" as used herein shall be understood to mean both "and" and "or", that is the word "or" means either or both of the things mentioned.

According to aspects of the disclosure a content system may provide client devices with a browser-based user interface that includes a media player, a presentation canvas, and a clip bin manager. The media player may be arranged to display either a live or previously recorded media stream in a variety of different file formats. The presentation canvas may be arranged to display a sequence of content items that also include digital files in a variety of file formats. The types of file formats could include "Image" (.PNG, .JPG, BMP, .TIFF, etc.), "Video" (.MP4, .WMV, .TS, etc.) and "Document" (.PPT, .DOC, .XLS, .PDF, etc.).

The clip bin manager may permit the selection and display of a variety of different file types onto the content presentation canvas. The clip bin manager may be implemented using processor-executable instructions that are executed by a processor of the content management system and/or using dedicated hardware (e.g., an application-specific integrated circuit ASIC, field-programmable gate array FPGA, etc.) The clip bin manager may be used to present the same file on the respective presentation canvases of different communications session (e.g., Virtual Meeting Room (VMR)) participants. Multi-page files stored using the clip bin module may be selected for display in the presentation canvas requiring that each page of the file be easily viewed and managed within presenter canvas through the use of an image viewer of some kind.

In some implementations, the clip bin manager may be configured to convert any of the files that it is used to present into a uniform format. For example, the clip bin manager may convert each page of an uploaded document file (i.e. .PPT, .DOC, .XLS, .PDF) into an image file for efficient display in any type of web browser. This same application may need to also allow for the processing of image and video files into one or more standardized formats to enhance the efficiency and responsiveness of the content management system.

In some implementations, the browser-based user interface may be permit users to place annotations of various kinds onto an image on display in the presenter canvas and then disseminate those image modifications among one or more other client devices that are participating in the online collaboration session. In addition, the method may also include the ability for a participant (not in control of the presentation canvas) to make annotations to the image located in the presenter canvas of their client device, which are viewed by that participant but hidden from all others. For example, the client device of the participant not in control of the content presenter canvas may detect a first input (e.g., the use of a highlighting tool to bring attention to a specific content item) related to the content presentation canvas, and then this same content item displayed in the presentation canvas may be modified (e.g., by the content management system or the client device) in response to the first input.

In some implementations, an image placed in the presentation canvas that has then been annotated (on the client device of the session participant in control of the presentation canvas) can be "saved and stored" into a clip bin that is managed by the clip bin manager. The image may then be presented on a second presentation canvas, one that can only be viewed by the session participant who opened the second canvas.

In some implementations, the content management system may include a centralized electronic device for recording and managing all aspects of a VMR session including activities that take place on each client device. This centralized device may include a display, a storage facility and a processor. The processor may be configured to detect the amount of bandwidth available to each client device and then moderate the transfer of data and video streaming to accommodate the functionality and capacity of each client device. The processor may transmit an instruction to disseminate only a certain set of image and video streams to one or more client devices that are participating in a VMR session.

An integrated online or virtual collaboration system (e.g., system 100) is described with reference to FIGS. 1-5.

The system 100 may be configured for use as a web service application that is able to be accessed from either a computer or a mobile device (i.e. tablet or smartphone) and may facilitate a variety of functions or operations including, for example, videoconferencing, digital file display and annotation, live video streaming, sharing of stored/retrieved video/image/document files, live event recording, file upload and download, chatting and content archive. The system may be utilized via standalone computers (with Public Internet access) or via a network of computers with access to the Public Internet, all of which can be utilizing either high or low bandwidth networks. In an embodiment, the system may be accessed via any of the standard web browser interfaces (i.e. Internet Explorer, Mozilla Firefox, Chrome and Safari) accessible from any client device.

Referring to FIG. 1, a schematic diagram of a system 100 is shown that includes an external data provider 102, a content management system (CMS) 104, and client devices 106.

The data provider 102 may include any suitable type of device that is arranged to transmit data to CMS 104 (in advance of or during a virtual collaboration session) for presentation during a live or recorded virtual event. The data provider 102 may include a map server (e.g., a GOOGLE MAPS or ESRI server), a streaming media server (e.g., a streaming video server, a streaming audio server), one or more Internet Protocol (IP) cameras, and/or any other suitable type of data transmitting device. In some implementations, the data provider 102 may be part of a device, such as the IP camera on a drone or autonomous vehicle, that is operating in the field to collect data in real-time while the ongoing conference is taking place.

The CMS 104 may include one or more database servers, a streaming media server, a file server, and/or any other suitable type of device that is configured to bring virtual collaboration capability to the client devices 106.

The CMS 104 provides a collaborative environment that may link data, graphics, streaming video, and other digital sources into a private cloud to facilitate presentations, work sharing, research, and other learning activities among participants in geographically disparate locations such that they can participate in a single event or meeting or session. By way of example, the CMS 104 may provide some or all of a rich-media presentation platform; live and recorded video streaming; lecture and/event capture services; virtual collaboration and/or social learning sessions; performance measurement analytics; enterprise-grade security for computers and mobile devices; premier content management; and/or centralized event scheduling. It is to be understood that the CMS 104 may include a plurality of servers (or other devices) distributed across multiple locations and technology platforms.

As illustrated, the CMS 104 may include, for example, a processor(s) 104a, a memory 104b, and/or a communication interface(s) 104c (e.g., 4G, LAN, etc.) or any suitable hardware architecture that can be used to implement any of the client devices 106 and/or any server or device that is part of the CMS 104. The CMS 104 may include any suitable type of processing circuitry, such as one or more of a general-purpose processor (e.g., an ARM-based processor or an AMD64-based processor), a Field Programmable Gate Array (FPGA), an Application Specific Integrated Circuit (ASIC), or a Digital Signal Processor (DSP). The memory 104b may include any suitable type of volatile or non-volatile storage. For example, the memory 104b may include a Random Access Memory (RAM), a hard drive (HD), a solid state drive (SSD), a cloud-based storage, a remote storage, or a Network-Accessible Storage (NAS). The clip bin manager 104b-1 may include processor-executable instructions that are arranged to manage and operate a clip bin for a particular VMR. The communications interface 104c may include any suitable type of wired or wireless communication interface, such as an Ethernet interface, a 4G interface, or a WiFi interface.

The client devices 106 may include any suitable type of electronic device capable of interacting with the CMS 104 and participate in one or more virtual collaboration session(s) that are being managed using the CMS 104. For example, any of the client devices 106 may include one or more of a desktop computer, a laptop, a tablet or a smartphone. According to aspects of the disclosure, at least one of the data provider(s) 102 and the device(s) 106 may be connected to CMS 104 via any suitable type of communications, such as, for example, the Internet, a Wi-Fi network, a LAN, a WAN, a 4G network, etc.

Figure 2A:
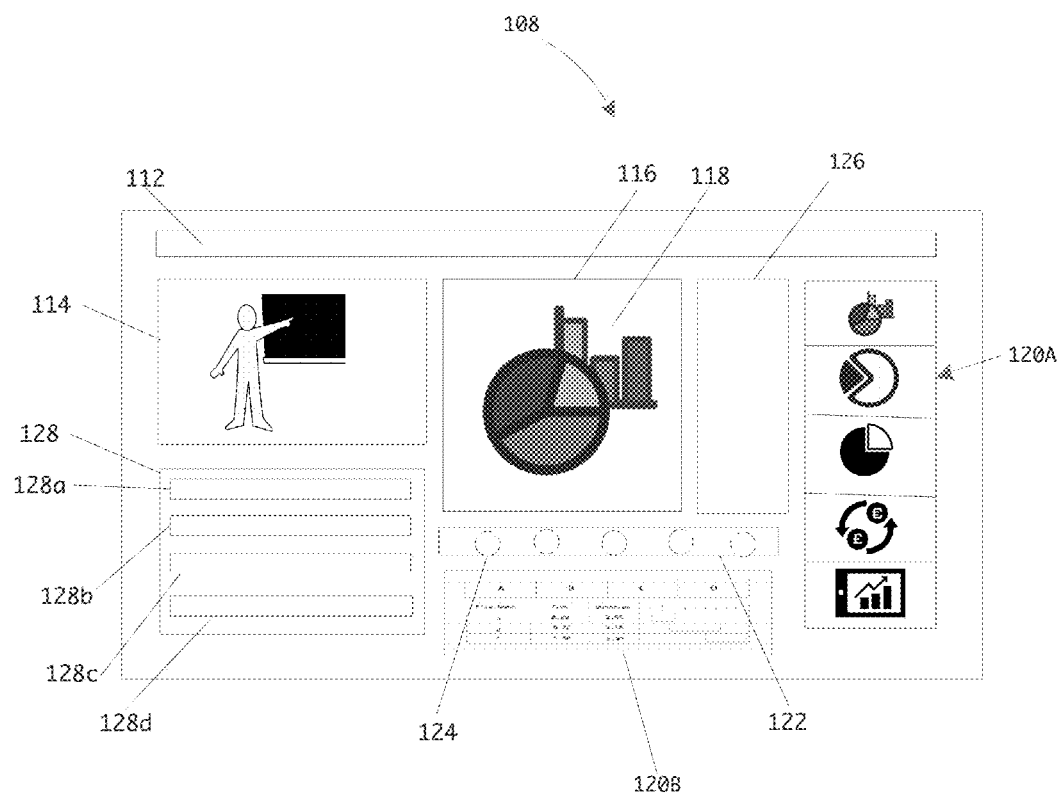
FIG. 2A depicts an embodiment of a graphical user interface for a virtual meeting application.
Figure 2B:
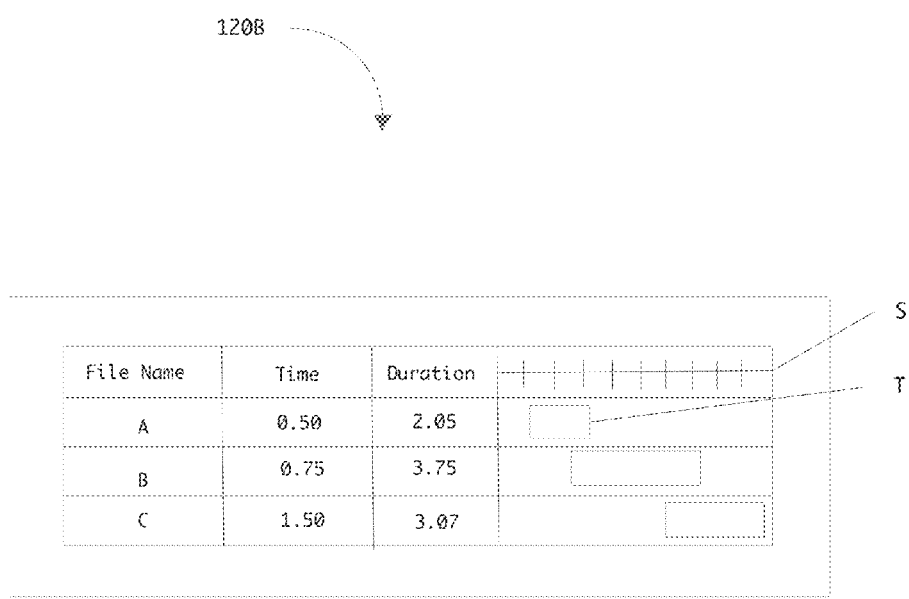
FIG. 2B depicts a portion of the graphical user interface of FIG. 2A.

FIG. 2A is a diagram of a graphical user interface 108 for participating in a Virtual Meeting Room (VMR) session that is conducted by using the CMS 104. The interface may be presented on any one of the client devices 106 when the client device is used to participate in the VMR. The interface may be either browser-based or an application, such as an iOS/Andriod Application (App), that can be executed without the need for a web-browser. In instances in which the interface is browser-based, the interface may be provided by the CMS 104 to any of the client devices 106 upon logging to the CMS 104, after which the interface 108 may be displayed in a web browser (e.g., Internet Explorer, Firefox, Chrome, Safari, etc.) As shown best in FIG. 2A, the user interface 108 may provide a rich-media platform in which a given participant in the VMR may receive, send, and/or edit information over the course of the VMR.

As illustrated, the user interface 108 may include a status bar 112 that will display status updates, such as an indication (e.g., visual indication) that is provided when a participant joins and/or leaves the VMR, when a participant takes or releases control of session, when a participant annotates a shared image, as well as a host of other real-time session activities. For example, when a participant is annotating an image, an indication of the type of the annotation (e.g., the type of the annotating tool that has been activated in the toolbar, etc.) may be provided to the other participants. The status bar 112 may also allow a participant to select and/or toggle between a variety of session functions (e.g., login/logout, select clip bin, administration of "live" and/or recorded video streams, selection of video streams in full motion or frame-by-frame mode, chatting, digital note taking, live map view, digital whiteboard, content sharing and annotating, select multilingual audio stream, view logged-in participants, user security settings, etc.).

The user interface 108 may further include the presentation of full motion or frame-based streaming video in the video player window 114. The video player 114 may display the contents of a media stream that is transmitted by the CMS 104. The media stream may include any suitable type of content in either a standard- or high-definition. For example, the media stream may include live video of one of the participants in the VMR (e.g., a lecturer or presenter). As another example, the media stream may include a prerecorded video of a lecture or presentation. As yet another example, the media stream may include a live video stream from an IP camera located on an unmanned air or surface vehicle, a fixed surveillance camera, a hand-held mobile device (such as a iOS or Android device) or a body cam (i.e Go-Pro).

According to aspects of the disclosure, an administrator of the VMR may select which video stream is to be displayed in the video player window 114. In some implementations, where there is insufficient bandwidth to properly stream video content in a full-motion format, a series of still images (or frames) that are created as part of the media stream, along with corresponding audio, may be automatically provided to the participant (or to the client device executing the interface 108) such that the participant may both view (in frame mode) the stream selected by the administrator According to aspects of the disclosure, a user participating in the VMR may select a portion of content that is streamed (e.g., in full motion format or as a set of frames for replay. The replay may facilitate (1) selecting a single frame to share, annotate, save, or (2) creating a separate and distinct video file for addition to the clip bin and Content Management System 104. For example, during the replay, a participant may select a first frame in the content (e.g., a mark-in point) and a second frame in the content (e.g., a mark-out point). In response to the selection, a separate clip may be extracted by the client device of the user from the content that starts with the first frame and ends at the second frame. After the clip is created, it may be associated with participant drafted notes and added to the clip bin associated with the VMR session that is currently taking place.

The user interface 108 may further include a presenter's collaboration canvas 116. The presenter's collaboration canvas 116 may display a content 118 that is transmitted by the CMS 104. In some implementations, the content 118 may be a series of images generated through the use of a ".PNG image generation" utility designed to work in conjunction with the CMS 104. For example, a given image in the series may be generated based on a single page that is part of a multi-page document (e.g., a .DOC, .XLS, .PPT or .PDF file). For example, in the event that an 8-page MSWord or PowerPoint file is selected for upload into the VMR Clip Bin/Clip Bin Viewer, eight (8) distinct .PNG files will be created and stored in the Content Management System 104 (e.g., in the clip bin that is associated with a particular VMR session) and then displayed in the clip bin view as a single document file. Although in this example, PNG images are generated, in other implementations, any suitable lossy or lossless image format may be used (e.g., JPG).

In some implementations, the CMS 104 may generate a data structure that represents a particular document that is stored in the clip bin. The data structure may include one or more of an ID for the document, a file name of the document (e.g., a word doc file, a title of the document, and an identification of a plurality of images (e.g., the PNG image files) that are generated based on the document and may represent different pages from the document, an identification of an order of the plurality of images, etc. When this type of document file is selected for presentation in the collaboration canvas, each of the created .PNG files are presented in the vertical image carousel 120A located along side of the presenter collaboration canvas 116. In some implementations, the CMS 104 may display the PNG images in the carousel 120A based on which PNG images are generated. For example, the CMS 104 may display the PNG files in the carousel 120A in an order corresponding to the original file and based on the data structure.

A VMR session participant may be given control over the presentation canvas 116 of all participants in the VMR session. In such instances, the user may select a document that the user wants displayed in the presentation canvas and transmit a display instruction to the CMS 104 that identifies the document. In response to the instruction, the CMS 104 may disseminate the first page of the document to all participants in the VMR session along with an instruction that instructs the respective user interfaces 108 of the participants to display the first page in their respective presentation canvases.

In one specific implementation, the VMR session participant may select the document by dragging the document (e.g., dragging an icon corresponding to the document) from the user's clip bin viewer 126 to the user's presentation canvas 116. In response to the document being dragged, the user's interface 108 may generate and transmit to the CMS 104 a display instruction. The display instruction may include one or more of an instruction to generate a new sequence of content items for display in the presentation canvas (e.g., a new sequence of .PNG files) and an instruction to display the new sequence of content files. Upon receiving the instruction, the CMS 104 may generate the new sequence of content items and transmit at least one of the content items to the remaining participants in the VMR session (and/or the VMR session participant with control over the presentation canvas) along with an instruction to display the at least one content item in the remaining participants' presentation canvases 116. As used throughout the disclosure, the phrase "instruction to generate a sequence of content items" may include any instruction that directly or indirectly causes the CMS 104 to generate the new sequence of content items (e.g., sequence of .PNG files) that is presentable in the VMR session participants' presentation canvases. Upon receiving the instruction, each of the remaining VMR session participants (and/or the VMR session participant with control over the presentation canvas) may display the new sequence of content items in the participant's respective presentation canvas.

In addition, the CMS 104 may update a data structure that represents the state of the presentation canvas of each participant in the VMR session. As can be readily appreciated, the data structure may include an ID for the document that is currently on display in the presentation canvases of the VMR session participants, as well as a specific page of the document that is currently on display in the presentation canvases 116 of the VMR session participants. Afterwards, when the user wants another page in the document to be displayed in the respective presentation canvases of the VMR session participants, the user may transmit a corresponding instruction to the CMS 104. The instruction may identify a specific page or it may simply instruct the CMS 104 to display the next page. In the latter case, the CMS 104 may identify the next page by using the data structure.

Additionally, or alternatively, other types of image and video files may be selected for presentation in the presenter collaboration canvas 116. Other file types include (but are not limited to): JPG, .GIF, .BMP, .TS, .MP4, .MP3 and WMV. Each of these files types can be placed into the Content Management System 104 (e.g., in the clip bin that is associated with a particular VMR session) for subsequent display in the Clip Bin Viewer 126 and launch into the presenter collaboration canvas 116 during a VMR session.

In each implementation, the content 118 may be generated by the CMS 104 and displayed on the client device using the VMR user interface 108. As noted above, a uniform format may be an image format (e.g., .PNG). In generating the images in the content 118 for a particular client device, the CMS 104 may take into account the resources available to the particular client device. For example, if the particular client device has low network bandwidth and/or a small screen, the CMS 104 may create image files in a lower resolution (or color depth) than otherwise.

In some implementations, the CMS 104 may provide (as an alternative to the content 118) a view of a global map using plugin applications such as Google Earth or ESRI ARCMap to the client device 106, which displays in the presenter collaboration canvas 116 of the user interface 108. For example, the CMS 104 may transmit to the client device 106 multiple different global map views that contain varying "zoomed in" presentations of different focal points (i.e. a city, a sea port, a mountain range, etc.). In this same implementation, the CMS 104 may provide the ability to annotate or markup the full-scale map image and then save the annotated image presented in the collaboration canvas 116 as content 118 for a low-bandwidth consumption view to the client device 106. In another implementation, the full-scale map image placed in the presenter collaboration canvas 116 may be used to directly correlate geospatial and temporal data that is associated with the live or previously recorded video stream being presented in the video player window 114. For example, an IP stream may be transmitted from an external data provider 102 (such as a manned or unmanned aircraft) to the CMS 104. The IP stream may then be forwarded by the CMS 104 to the client device 106 along with an indication of the location of the source of the IP stream (e.g., the manned or unmanned aircraft.) Subsequently, the IP stream may be displayed in sync with the indication of the IP source's location in the collaboration canvas 116, such that each frame that is displayed along with an indication of the IP source's location when the frame was captured.

In some implementations, the User Interface 108 may permit one or more participants to overlay various types of markings or annotations onto the content 118 that is displayed in the presenter collaboration canvas 116. These annotations or markings will include, for example: pen drawing, brushing, text insertion, identifying symbols/markers and/or the use of geometric shapes or objects. The annotated content 118 can then be saved as either (1) a new image file (e.g., a .JPG file) or as an edited version of the source file already present in the clip bin viewer 126. The marked-up or annotated version of the image files may be automatically uploaded to the clip bin by the CMS 104 at which time it become available content for presentation in the presenter collaboration canvas 116.

As mentioned previously, interface 108 includes the display and may use clip bin viewer 126. Clip bin viewer 126 may serve as both the primary interface to the CMS 104 and the user interface directory of files available to the participants of a VMR session. The clip bin is digital location in which content saved and/or modified, annotated, or created by participants (prior to or during a VMR session) may be uploaded.

When on display in the VMR user interface 108, the clip bin viewer 126 for a particular VMR session serves as the drop point for any and all files (and file types) that a participant or administrator may want associated with the VMR session. For example, a given participant or administrator may drag and drop into the clip viewer any content (e.g. WORD files, JPEG images, etc.) which the participant or administrator would like to displayed in the collaboration canvas 116 during s during a particular VMR session. Any content that is dragged into the clip bin viewer 126 during the VMR session may be uploaded to the CMS 104 and made available anywhere on the CMS 104 for both local and global access. In particular, the uploaded content 118 may be available as part of the CMS to facilitate a global and remote communication and collaboration environment. Uploaded content may be captured, stored, and/or archived via enterprise or cloud capture services where they can be later searched, retrieved, and/or analyzed.

In some aspects, when a file is uploaded to the clip bin, metadata for the file may be created. The metadata may be stamped in the file or stored in a separate location. The association of metadata with content placed in the clip bin 126 permits the files or products placed in the clip bin to be searched or filtered by the participants based on a variety of criteria, such as, for example, the type of file, the date/time the file was created, notes associated with the file, etc.

The interface 108 may further include a history window 120B. A magnified view of the history window 120B is provided in FIG. 2B. The history window 120B may provide geospatial and temporal information for content presented during the VMR session, as well as levels of participant participation during the VMR session, by providing information regarding, for example, the names of files, documents, etc. that were presented in the canvas 116 during the VMR session, along with the respective times which each content item was presented, as well as an indication of the duration for which each content item remained on display in the canvas 116. In some implementations, a scale S and bars T of varying lengths corresponding to time stamps may be positioned relative to the scale S such that a visual representation of when and for how long content 118 (e.g., files A-C) are provided. Although in this example the history window is shown during the VMR session, in other implementations the history window 120B may be presented after the VMRM session has been completed in order to provide the organizers and participants with an outline of what was discussed during the session and a view of the level of involvement of each participant.

The interface 108 may further include toolbar 122 for the intended purpose of enhancing the content 118 while on display in the presenter collaboration canvas 116. The toolbar 122 may include one or more input components (e.g., color pallet, geometric shapes, font size adjustment menu, radio Save buttons, etc.) Each one of the input components may be associated with one or more selectable tools 124 for annotating and/or marking content 118 presented in the presenter collaboration canvas 116 during the VMR session. The tools 124 may facilitate a variety of functions, for example: image highlighting, text insertion, freehand sketches, adding geometric figures, and/or other markings to the image files that are presented as content 118. The content 118 may be marked up (e.g., annotated, marked, highlighted, etc.) when displayed in the presenter collaboration canvas 116. In another incidence, the content 118 may be marked up (e.g., annotated, marked, highlighted, etc.) when displayed in a VMR session participant's private display window.

Pant-Tilt-Zoom (PTZ) Control may also be provided as a separate tool within the user interface 108 for controlling the state of any IP camera (with incorporated PTZ control functionality) configured as an External Data Provider 102 to the VMR session. For example, the tool may permit panning, tilting, and zooming of each of the cameras and/or IP video steaming devices configured as part of the VMR session from any location and by a participant with the properly-assigned privileges.

In some aspects, metadata may be collected (e.g., digital breadcrumbs that are generated by the user interface 108 over the course of a VMR session) that indicates how the participant interacts with the user interface 108 during the session. For example, the metadata may identify activities performed by the user during the VMR session including, for example, chatting, responding to polling questions, uploading/downloading files, marking up content, etc. The metadata may be uploaded to the VMR's respective clip bin(s) and may be made accessible to participants (e.g., corporate trainees or students) at the time of the VMR session and/or anytime thereafter.

In some aspects, the collection of such metadata may facilitate performance measurement and/or learning analytics, and may allow instructors, management, and/or administrative staff to examine correlations between online learning activities and increased knowledge or performance. Such performance measurement or learning analytics may facilitate timely interventions for those employees and/or students that are at greatest risk, as well as, to aggregate data to evaluate whether changes in curriculum are necessary.

During both synchronous and asynchronous VMR events, participants may create a condensed or edited version of the video streams. A participant may also pause, stop, and/or re-start the asynchronous presentation. During a live session, the participant may activate the Instant Replay tool to create a video clip/segment associated with the video streaming in the Video Player window 114. The participants may restrict access to the content they have created such that the content may be viewable to select participants, e.g., to the creator of the content, to some participants, or to all of the participants.

The participant's Private Work Area (PWA) 128 section of the User Interface 108 may provide one or more session-related "activity" modules 128a-d that facilitate communication and sharing between the VMR session moderator and each of the participants, while also providing self-help functionality for each individual participant. For example, the PWA box 128 may include a first module 128a that displays a series of video stream channels, each of which can be selected for viewing in the video player window 114. This plurality of video streams (e.g., the video stream of a presenter or speaker, or of the stream of an aerial view video captured from a surveillance camera mounted to a surveillance aircraft or drone) may be available during a VMR session and selectable for viewing either by the participant directly or by the session moderator/instructor. Participants may also share video streams (e.g., pre-recorded video or live video of, for example, the participant's personal web-cameras) via a second module 128b, which the participant may select to cast or stream to the other participants.

A message broadcast/Chat module 128c may facilitate text communication between two or more participants. For example, the message broadcast/chat module 128c may include an area or space in which a word or phrase or other content (e.g., emoticons and the like) may be input and then broadcast as a message to one or more selected participants or to all of the participants. After inputting a message into the message broadcast/chat module 128c, the participant may confirm by selecting an option to broadcast the message thereby transmitting the message to the other participants, which may be displayed to the other participants as an alert or pop-up message. The chat component of 128c may be provided to allow participants to input chat data or messages (e.g., text messages, audio recordings or video recordings) and to send the chat data to one of the entire group of participants (including initiators) or to select individual participants of the meeting.

In addition to the other three PWA modules, there may be a Session Participant Polling module 128d that permits the VMR session moderator to initiate true/false, yes/no or multiple choice question and answer activities, opinions and feedback activities, and the like. All such activities may be recorded and/or correlated in an analytic engine where they can be viewed both temporally and geographically in a table or the like such as within the History window 120B.

Finally, the PWA 128 may include a digital note pad module 128e for the purpose of allowing VMR session participants to track and document pertinent activities throughout the session in their own words and style and then save this text file to their personal session bin for future reference and review.

Figure 3:
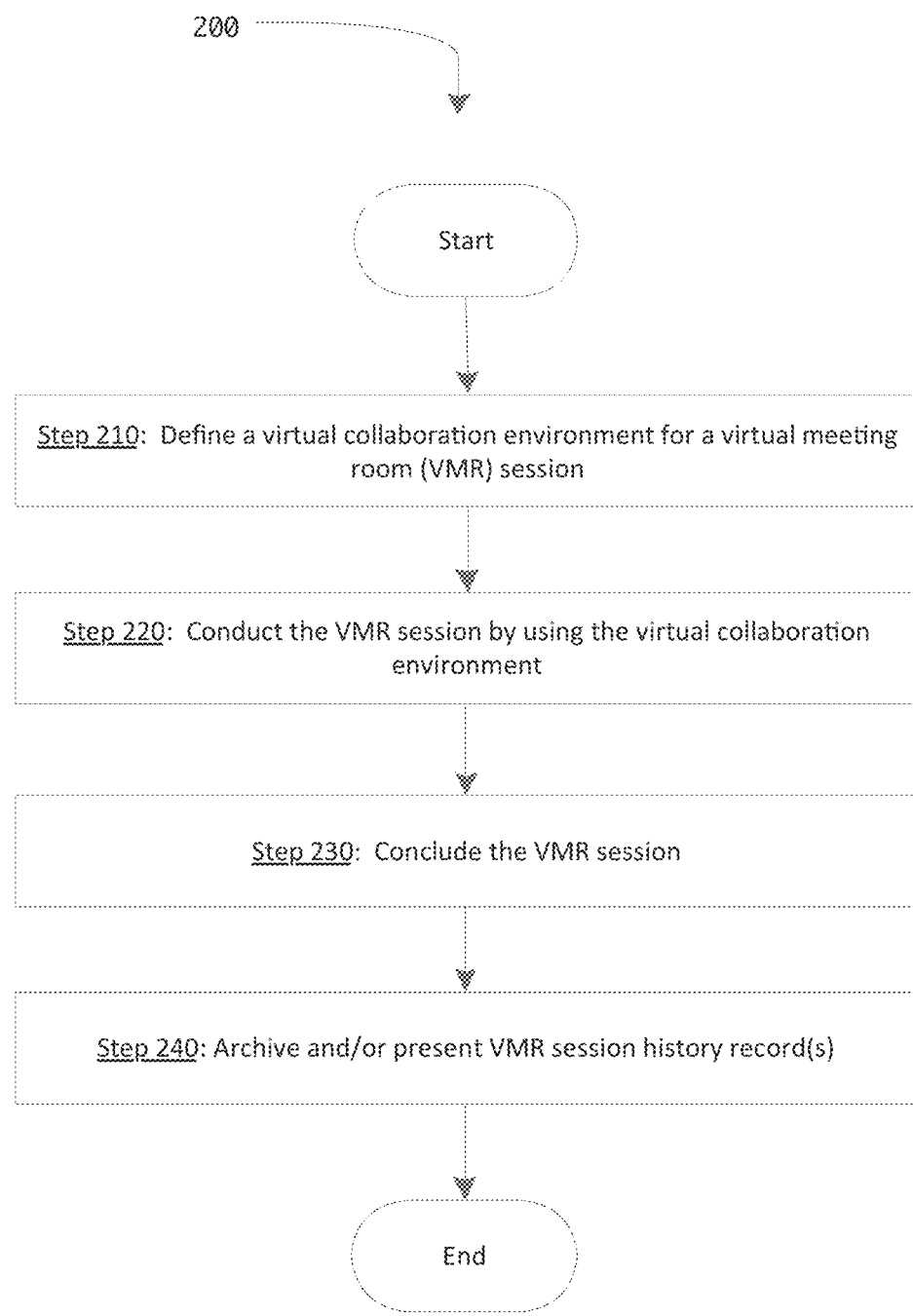
FIG. 3 depicts a flowchart of a process performed by the system of FIG. 1.

FIG. 3 is a flowchart of an example of a process 200 for conducting a VMR session, according to aspects of the disclosure. As used throughout the disclosure, the term "Virtual Meeting Room (VMR) session" refers broadly to any suitable type of communication session in which some type of content (e.g., audio content, visual content, or audiovisual content) is exchanged between any two or more of the client devices and/or any of the client devices 106 and the CMS 104. For example, the term "Virtual Meeting Room (VMR) session" may refer to any suitable type of communications session, such as a video call, an audio call, an online lecture, a virtual meeting, and/or combination thereof.

At task 210, a virtual collaboration environment for the VMR session is defined. Task 210 is discussed in further detail with respect to FIG. 4.

At task 220, the VMR session is conducted by using the virtual collaboration environment. Task 220 is discussed in further detail with respect to FIG. 5.

At task 230, the VMR session is concluded. When the VMR session is concluded, all streams that are presented during the VMR session and content items inserted into the VMR session's respective clip bin may be archived in CMS 104 for later search, retrieval, and analysis. In addition, a full-session record can be used to capture all elements of the session (i.e., a video stream, the content of a collaboration canvas, etc.). In some implementations, a condensed version may be created of a video stream presented during the VMR session. For example, the video stream may be one that is presented in the video player window 114. The condensed version of the video stream may include highlights from the video stream, and may be created by using video-editing tools that are made available with the interface for conducting the VMR session. The condensed version may also be archived by the CMS 104.

At task 240, activities that occurred during the VMR session may be catalogued and/or archived, and the user may be presented with one or more history records of the VMR session. In some implementations, each participant's online activities may be graphically represented in a timeline to show what has been captured and annotated. Additionally or alternatively, the condensed version of the media stream may be displayed. Additionally or alternatively, the full-session record stored at task 230 may be used to render various events that took place during the VMR session in sequence. The playback may be effectuated based on time-stamps associated with the display of images in a participant's collaboration canvas, the input of annotations of the users, and/or various other actions performed by the participant.

Figure 4:
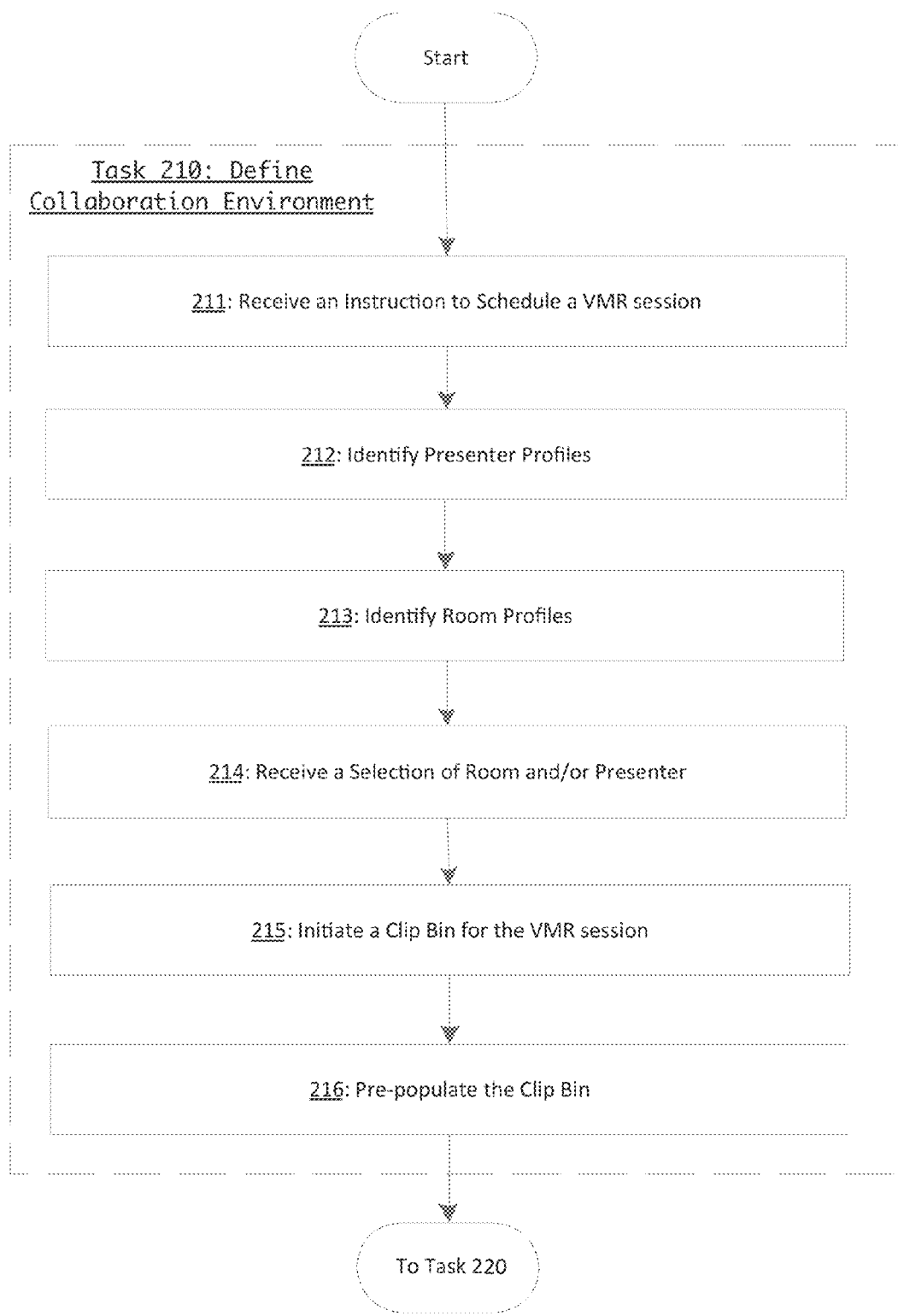
FIG. 4 depicts of a flowchart of a sub-process associated with the process of FIG. 3.

FIG. 4 is a flowchart of an example of a sub-process or task 210 for defining a virtual collaboration environment of the process 200 for conducting a VMR session. In particular, task 210 may include a step in which the CMS 104 may receive an instruction to schedule a VMR session. In some implementations, the instruction may identify a preferred time or time range for the conference, an identification of one or more presenters, an identification of a characteristic sought in at least one presenter (e.g., expertise in a particular subject), a location where the presenter needs to be present, a number of participants expected to be present, etc. The instruction may be submitted by a user, herein referred to as "initiator."

At task 212, in response to the instruction, the CMS 104 identifies one or more presenter profiles that satisfy a first predetermined criterion. In some implementations, the criterion may be determined by the CMS 104 based on information received along with the instruction to schedule the conference. Additionally, or alternatively, in some implementations the criterion may be specified by the initiator. For instance, the CMS 104 may identify one or more profiles of presenters who have an expertise in a subject matter specified by the initiator.

At task 213, the CMS 104 may identify one or more room profiles that satisfy a second predetermined criterion. By way of example, the term "room" may refer to either a physical location (e.g., a broadcasting location) where a presenter is required to be present or a virtual room. The physical locations may include suitable hardware as required by the system including, for example, computing equipment, video cameras, microphones, etc. By way of example, the second criterion may be determined based on information submitted with instruction to schedule the VMR session or specified separately by the initiator. For example, the CMS 104 may identify one or more rooms that are available at a time desired by the initiator. Additionally, or alternatively the CMS 104 may identify one or more rooms that have a desired seating capacity or location. Additionally or alternatively, the CMS 104 may identify one or more rooms that have a desired bandwidth, and or other computing resources necessary for conducting a VMR session (e.g., computing resources needed to support a given number of session participants and/or computing resources needed to support the manipulation and/or exchange of a given type of content between the session participants.

At task 214, the CMS 104 selects a combination of a room and presenter (and/or other participants) for the VMR session. In some implementations, the CMS 104 may provide the initiator with a list of available participants and/or available rooms that were identified at tasks 212, 213. Afterwards, the CMS 104 may receive from the initiator a selection of one of the rooms and/or participants and schedule the conference accordingly. Alternatively, in some implementations, the CMS 104 may identify presenter-room pairs based on the availability of the presenter(s) the room(s), and provide the initiator with a list of the identified pairs. Subsequently, the CMS 104 may receive a selection from the initiator of one of the pairs, and schedule the VMR session accordingly. In some implementations, scheduling the session (e.g., teleconference) may include one or more of scheduling calendar appoints for the participant, and or making reservations for the room and/or other resources needed to conduct the VMR session.

At task 215, the initiator selects a clip bin for the VMR session. The clip bin may include a storage location that is dedicated to storing various types of data items related to the VMR session. The clip bin may be implemented by using one or more relational database(s), a file server, cloud storage, and/or any other suitable mechanism for storing data. In some implementations, the data stored in the clip bin may be available to all participants in the VMR session. Additionally or alternatively, in some implementations, the CMS 104 may enforce access restrictions on the data stored in the clip bin. For example, the CMS 104 may grant or deny access to a given content item in the clip bin to a user based on a permission record associated with the content item that specifies which users and/or user groups are to have access to that content item.

At task 216, the CMS 104 stores data in the clip bin that is uploaded by the initiator and/or session participant. The data may include any suitable type of data (e.g., document file(s), video file(s), image(s), audio file(s), etc.), which the initiator expects to be used during the VMR session. During instances in which the clip bin is implemented using a relational database, storing the data in the clip bin may include associating the data with a Session ID for the VMR session. Additionally, or alternatively, in instances in which the clip bin is implemented using a file server, storing the data in the clip bin may include uploading the data to a particular file system directory that is associated with the Session ID for the VMR session.

Figure 5:
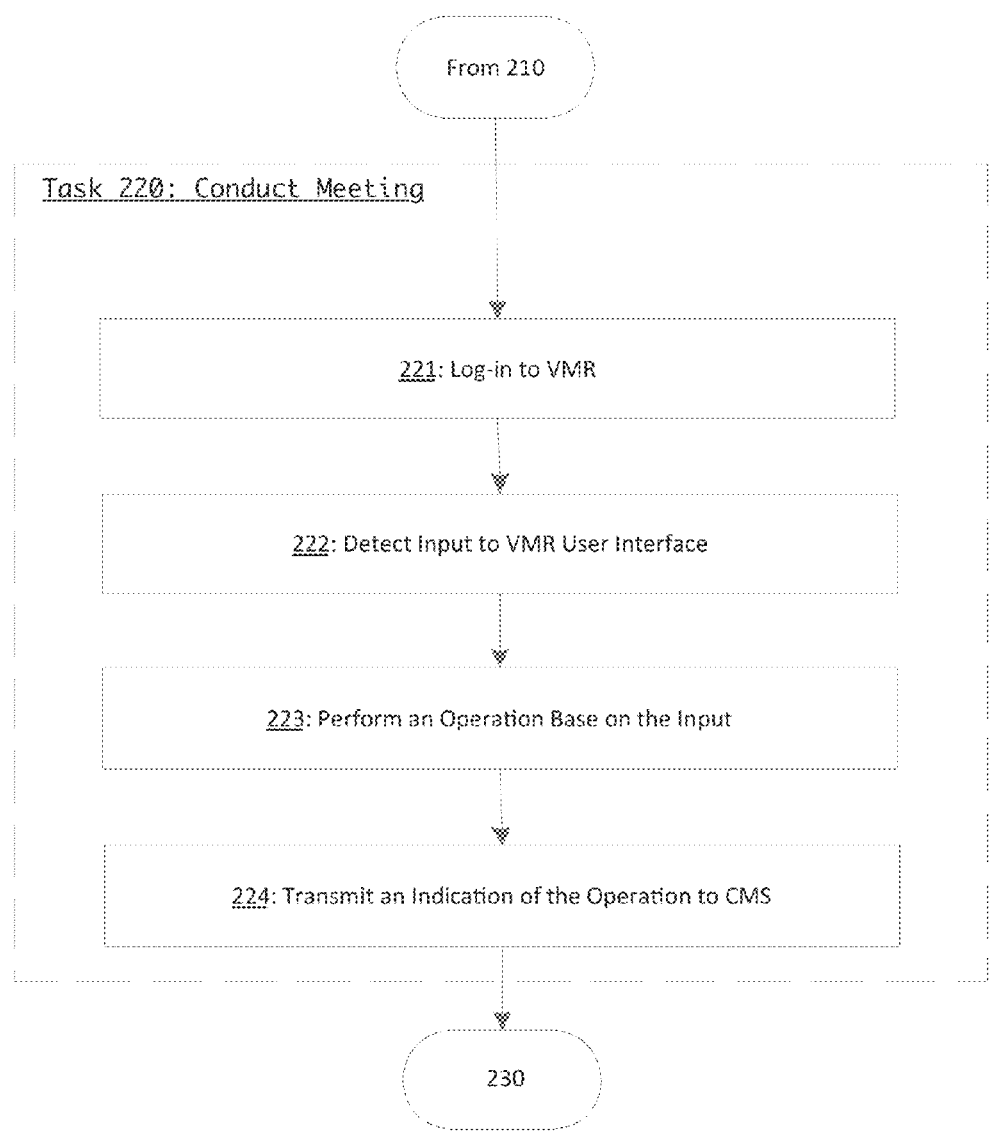
FIG. 5 depicts a flowchart of a sub-process associated with the process of FIG. 3.

FIG. 5 is a flowchart of a sub-process or task 220 of the process 200 for conducting a VMR session according to aspects of the disclosure. As shown in FIG. 5, task 220 may include various steps or tasks. At task 221, one or more participants may log into a room allocated for the VMR session. When the participants are logged into the room, their client devices may display the user interface 108 for conducting the VMR session. At task 222, the client device 106 of one of the participants receives input to the interface 108. At task 223, the client device performs an operation based on the input. And at task 224, the client device transmits an indication of the operation to the CMS 104.

For example, at the onset of the VMR session, the initiator and/or other participants having sufficient privileges may determine what media stream is going to be shown in the video player window of the VMR session recipients. For example, the initiator may select one of multiple available media streams for presentation in the video player window. Afterwards, the client device of the initiator may transmit an indication of this stream to the CMS 104. Upon receiving the indication, the CMS 104 may isolate the stream, which is then fed to the client devices of the participants for display in the participants' respective video player windows. In some implementations where multiple streams are available for viewing by the VMR session participants, the CMS 104 will make each stream available to the participants' client devices. Additionally or alternatively, one or more of the streams may be received at the CMS 104 from external data sources.

In some implementations, the initiator and/or other participants having sufficient privileges may generate a live map view. These privileges may permit the display of several map layers, which can further be presented to the VMR session participants in the presenter collaboration canvas 116.

Alternatively, at the onset of the VMR session, the initiator and/or other participants having sufficient privileges may select a multi-page file stored in the VMR session's respective clip bin for presentation in the presenter collaboration canvas and transmit an identification of this unique file type to CMS 104. Afterwards, the CMS 104 may generate a sequence of content items based on the selected file, as discussed above, and present each individual .PNG file in the sequence requested by the initiator to each of the participant's respective collaboration canvases.

In another example, the VMR session initiator (or another participant who has sufficient privileges) may "share" a single image or video file (e.g., a text file, a digital photograph, an MP4 video file, etc.) that is shown in the clip bin viewer 126 with all session participants using the presenter collaboration canvas 116. In response to this input, the user interface 108 (or the device displaying it) may transmit to the CMS 104 an instruction to execute a display command of the selected file for presentation in the collaboration canvas 116. The instruction may include any indication of the file that the participant wants displayed and/or an indication of a particular portion of the file (e.g., a page number) that the user wants to be displayed.

As another example, a participant (with control of the presenter canvas) in the VMR session may annotate a given image (or another type of static content item) that is shown in the presenter collaboration canvas 116. For example, the participant may select a highlighting tool from the toolbar 122 and highlight text in the image.

As another example, the user may select a drawing tool from the toolbar 122 and add a drawing to the image. As another example, the user may select a text tool from the toolbar 122 and add text to the image. On each occasion that an image is modified with an annotation of any kind, these markings are immediately (and automatically) transmitted to the presenter collaboration canvas of each participant in the VMR session through the CMS 104. Also when the image is annotated, the user interface 108 (or the device displaying it) may transmit to the CMS 104 an instruction to store the annotations in the VMR session's on the image that is current stored in the respective clip bin. The instruction may include any suitable type of message that includes an indication of the annotation and is used by the CMS 104 to store the annotation in the participants' respective clip bins and/or disseminate that annotation among other teleconference participants. The indication of the annotation may include the annotation itself, a pointer to an address (e.g. on the client device or in the clip bin) from where the annotation may be retrieved by the CMS 104, etc. In this implementation, the instruction to annotate may be automatically transmitted in response to the user input creating the annotation (e.g., a drag of a highlighting tool across text, etc.). Thus, the image shown in the collaboration canvas 116 can be both annotated and disseminates in response to the same input.

In response to the instruction, the CMS 104 may modify a content item stored in the clip bin that is represented by the annotated image to include the annotations. Additionally or alternatively, in response to the instruction, the CMS 104 may update the content 118 that is presented in the participants' respective collaboration canvases to include the annotations. As noted above, updating the content 118 may include transmitting an indication of the annotations to the other client devices that participate in the VMR session and/or updating a data structure that is used by the CMS 104 in generating the content 118.

In another example, a participant in the VMR session may capture and create an image file of one or more frames of video content that is displayed in the video player window 114. The participant may then annotate the recorded frames and transmit the recorded frames for storage in the clip bin associated with the VMR session in order for the captured frame(s) to be shared with one or more other participants in the session.

In another example, a participant in the session may pause the media stream that is being presented in the video player window 114. Pausing the media stream may cause the canvas 114 to display a still frame or image. Afterwards, the still frame or image may be displayed, and the participant may annotate the still frame as discussed and transmit an instruction to the CMS 104 to disseminate the still frame along with the annotation among the other participants in the session. In response to receiving the instruction, the CMS 104 may add the still frame to the content 118 for presentation in the canvas 116. As discussed above, the annotation and the transmission of the instruction to disseminate the annotation may be performed in response to an annotating input (e.g., an input in which the participant drags a highlighting tool or a drawing tool over the still image).

FIGS. 1-5 are provided as examples only. At least some of the tasks discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

Although the examples above are provided in the context of a video player window 114 and collaboration canvas 114, it will be appreciated that any of the video play window 114 and collaboration canvas can be replaced with any suitable type of canvas that is in some manner operable to display visual content (e.g., text, still images, video, etc.) As used herein, the term "canvas" may refer to any suitable type of user interface component that can be used to display visual content, such as, for example, video, images, files, etc.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Although some of the above examples are provided in the context of an IP camera and IP stream, it is to be understood that any suitable type of networked camera and/or media stream can be used instead. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". While the present disclosure has been particularly shown and described with reference to the examples provided therein, it is to be understood by those skilled in the art that various changes in form and details may be made therein without departing from the spirit and scope of the present disclosure as defined by the appended claims.

The invention claimed is:

1. A method for conducting a communications session comprising:
   displaying, by a client device, a communications interface including: (1) a first canvas; (2) a second canvas; and (3) a content browser, wherein: the first canvas is arranged to display a media stream the second canvas is arranged to display a sequence of content items provided by a communications system and the content browser is arranged to display identifiers for one or more files that are associated with the communications session, wherein the one or more files includes at least one of a video, image, and document format file;
   detecting a first input that selects a file from the content browser such that it is moved to the second canvas;
   in response to the first input, transmitting, from the client device to the communications system, an instruction to generate a new sequence of content items based on the selected file; and
   displaying the new sequence of content items in the second canvas, wherein each content item in the new sequence is represented by an image file that is generated to correspond to the content item in the new sequence,
   wherein at least one of the files identified in the content browser is associated with the communications session before the communications session is started, and the content browser is displayed during the communications session.

2. The method of claim 1, further comprising:
detecting, by the client device, a second input to the second canvas; and
modifying, in response to the second input, a content item displayed in the second canvas and transmitting an instruction to disseminate the modification among one or more other client devices that participate in the communications session.

3. The method of claim 1, further comprising:
detecting, by the client device, a second input to the first canvas; and
hiding, in response to the second input, a first content item from the second canvas and displaying a second content item in the second canvas.

4. A method for conducting a communications session comprising:
displaying, by a client device, a communications interface including a first canvas, a second canvas, and a content browser, wherein:
the first canvas is arranged to display a media stream;
the second canvas is arranged to display a sequence of content items provided by a communications system; and
the content browser is arranged to display identifiers for one or more files that are associated with the communications session;
detecting, by the client device, a first input to the second canvas; and
modifying, in response to the first input, a content item displayed in the second canvas and transmitting an instruction to disseminate the modification among one or more other client devices that participate in the communications session;
detecting a second input that results in a file being selected from the content browser and moved into the second canvas, wherein the file is at least one of an image, video, and document file;
in response to the second input, transmitting from the client device to the communications system, an instruction to generate a new sequence of content items based on at least a portion of the selected file; and
displaying the new sequence of content items in the second canvas, wherein each content item in the new sequence is generated by converting a different portion of the selected file from to an image format,
wherein at least one of the files identified in the content browser is associated with the communications session before the communications session is started, and the content browser is displayed during the communications session.

5. The method of claim 4, wherein modifying the content item includes at least one of highlighting a portion of the content item, adding a text note to the content item, and drawing a drawing in the content item.

6. The method of claim 4, wherein the content item includes at least one of a still image and text.

7. The method of claim 4, wherein the first input includes a drag of a highlighting tool over the content item, and the modification of the content item and the transmission of the instruction to disseminate the modification are both triggered by the first input.

8. The method of claim 1, wherein the media stream has a frame rate, the frame rate being selectable based on bandwidth.

9. The method of claim 1, wherein the media stream is a first video, and wherein frames of the first video are selectable, and further comprising creating a new video including one or more of the frames that are selected.

10. The method of claim 9, wherein the creating of the new video includes selecting a range of times including a start time and an end time, the new video including all frames within the range of times.

11. The method of claim 1, wherein the communications interface further comprises a participant work area including a content browser accessible to a first participant, the participant work area including a content portion and a communications portion, wherein the communications portion permits communication between the first participant and a second participant; and
further comprising detecting a second input selecting one of the content items in the second canvas and saving the one of the content items to the content browser located in the participant work area, and detecting a third input selecting a content item located in the content browser of the participant work area and displaying the content item in the second canvas.

12. The method of claim 1, wherein content of the media stream is transmitted to session participants asynchronously.

13. The method of claim 12, wherein the media stream is transmitted to session participants in a plurality of languages.

14. The method of claim 1, wherein geospatial and temporal data are associated with the content items.

15. The method of claim 1, further comprising: displaying a timeline, the timeline including a plurality of indications of different states of at least one of the first and second canvases at different times of the communications session.

16. The method of claim 1, further comprising: recording a state of a participant work area at different times of the communications session.

17. An electronic device for conducting a communications session, comprising a display and processor, and being configured to:
present, on the display, a communications interface including a first canvas, a second canvas, and a content browser, wherein: the first canvas is arranged to display a media stream the second canvas is arranged to display a sequence of content items provided by a communications system and the content browser is arranged to display identifiers for one or more files that are associated with the communications session;
detect a first input that moves a selected file from the content browser onto the second canvas;
in response to the first input, transmit to the communications system an instruction to generate a new sequence of content items base on at least a portion of the selected file; and
display the new sequence of content items in the second canvas, wherein each content item in the new sequence is generated by converting a portion of the file selected to an image format,
wherein at least one of the files identified in the content browser is associated with the communications session before the communications session is started, and the content browser is displayed during the communications session.

18. The electronic device of claim 17, wherein the processor is further configured to:
detect a second input to the second canvas; and
modify, in response to the second input, a content item displayed in the second canvas and transmit an instruction to disseminate the modification among one or more other client devices that participate in the communications session.

19. The electronic device of claim 17, wherein the processor is further configured to:
   detect a second input to the first canvas;
   hide, in response to the second input, a first content item from the second canvas and displaying a second content in the second canvas.

20. An electronic device for conducting a communications session, comprising a display and processor, wherein the processor is configured to:
   present, on the display, a communications interface including a first canvas, a second canvas, and a content browser, wherein: the first canvas is arranged to display a media stream the second canvas is arranged to display a content item related to a file provided by a communications system and the content browser is arranged to display identifiers for one or more files that are associated with the communications session,
   detect a first input to the second canvas;
   modify, in response to the first input, a content item displayed in the second canvas and transmitting an instruction to disseminate the modification among one or more other client devices that participate in the communications session
   detect a second input that selects and shares a file from the content browser onto the second canvas;
   in response to the second input, transmit to the communications system, an instruction to display a new sequence of content items based on at least a portion of the selected file, the new sequence of content items including at least one of an image and video; and
   display the new sequence of content items in the second canvas, wherein each content item in the new sequence is generated by converting a portion of the file to an image format,
   wherein at least one of the files identified in the content browser is associated with the communications session before the communications session is started, and the content browser is displayed during the communications session.

21. The electronic device of claim 20, wherein modifying the content item includes at least one of highlighting a portion of the content item, adding a text note to the content item, and drawing a drawing in the content item.

22. The electronic device of claim 20, wherein the content item includes at least one of a still image and text.

23. The electronic device of claim 20, wherein the first input includes a drag of a highlighting tool over the content item, and the modification of the content item and the transmission of the instruction to disseminate the modification are both triggered by the first input.

* * * * *